United States Patent
Haogland

(10) Patent No.: US 6,565,999 B1
(45) Date of Patent: May 20, 2003

(54) DESICCANT-FREE HEAT AND MOISTURE EXCHANGE WHEEL

(75) Inventor: Lawrence C. Haogland, Center Harbor, NH (US)

(73) Assignee: Airxchange, Inc., Rockland, MA (US)

( * ) Notice: Subject to any disclaimer, the term of this patent is extended or adjusted under 35 U.S.C. 154(b) by 111 days.

(21) Appl. No.: 09/588,362

(22) Filed: Jun. 6, 2000

(51) Int. Cl.⁷ .......................... H01M 8/04; H01M 8/10
(52) U.S. Cl. ................. 429/26; 429/30; 165/8
(58) Field of Search ............... 429/13, 26, 30; 165/8, 9

(56) References Cited

U.S. PATENT DOCUMENTS

| | | | |
|---|---|---|---|
| 3,965,695 A | 6/1976 | Rush et al. | 62/271 |
| 4,432,409 A | 2/1984 | Steele | 165/8 |
| 4,769,053 A | 9/1988 | Fischer, Jr. | 55/389 |
| 4,825,936 A | 5/1989 | Hoagland et al. | 165/8 |
| 4,875,520 A | 10/1989 | Steele et al. | 165/10 |
| 4,924,934 A | 5/1990 | Steele | 165/8 |
| 5,002,116 A | 3/1991 | Hoagland et al. | 165/9 |
| 5,323,842 A * | 6/1994 | Spokoyny et al. | 165/8 X |
| 5,650,221 A | 7/1997 | Belding et al. | 442/417 |
| 5,771,707 A * | 6/1998 | Lagace et al. | 165/8 X |
| 5,937,933 A | 8/1999 | Steele et al. | 165/10 |
| 6,013,385 A | 1/2000 | DuBose | 429/17 |
| 6,257,317 B1 * | 7/2001 | DeGregoria et al. | 165/8 |

OTHER PUBLICATIONS

International Search Report dated Sep. 11, 2001, 4 pages.

* cited by examiner

Primary Examiner—Stephen Kalafut
(74) Attorney, Agent, or Firm—McDermott, Will & Emery

(57) ABSTRACT

The present disclosure provides a system for conditioning a gaseous supply stream. The system includes a desiccant-free heat and moisture exchange wheel that efficiently transfers both heat and moisture between a warmer, substantially saturated gaseous exhaust stream and a gaseous supply stream such that the supply stream becomes heated and substantially saturated. The presently disclosed conditioning system, therefore, beneficially allows the use of a desiccant-free heat and moisture exchange wheel in applications requiring the transfer of both heat and relatively large amounts of moisture between counter-flowing air streams. The desiccant-free heat and moisture exchange wheel is designed in accordance with the present disclosure to transfer moisture through a process of condensation and re-evaporation. A desiccant-free wheel provides the benefits of being generally easier and less expensive to manufacture than an enthalpy wheel, which is conventionally used in such heat and moisture applications, since an enthalpy wheel includes a coating of desiccant material over its sensible heat exchange media for trapping, transferring, and releasing water vapor between counter-flowing air streams.

7 Claims, 2 Drawing Sheets

DESICCANT-FREE HEAT AND MOISTURE EXCHANGE WHEEL

BACKGROUND OF DISCLOSURE

1. Field of Disclosure

The present disclosure relates generally to regenerative heat exchangers and, more particularly, to rotary heat wheels for transferring sensible heat and water vapor between two counter-flowing air streams, when the warmer air stream is nearly saturated with water vapor and it is desired to heat and nearly saturate the cooler air stream. Even more particularly, the present disclosure relates to a desiccant-free heat and moisture exchange wheel, wherein wheel design and operating conditions produce large moisture transfers without employing desiccants conventionally used for such moisture transfers.

2. Description of Related Art

Regenerator heat exchange devices or regenerators are well known for effecting the transfer of heat and moisture between two counter-flowing air streams. One type of regenerator is the rotary air-to-air heat exchanger, which is typically in the form of a rotary heat exchange wheel including a matrix of heat exchange material. When rotated between counter-flowing air streams, the rotating wheel matrix is heated by the air stream with the higher temperature and, in turn, heats the lower temperature air stream. In addition, the rotating wheel may transfer moisture between the counter-flowing air streams. To promote moisture transfer, the wheel heat exchange matrix is usually made from, or coated with a moisture adsorbent desiccant material. Such heat exchange devices have been used in heating, ventilation and cooling (HVAC) systems for buildings, but have also been used for conditioning gaseous reactant streams for fuel cells.

In HVAC systems, rotary air-to-air heat exchangers are used to conserve energy within a building. During the heating season, such exchangers transfer heat and moisture from indoor air being exhausted to the outdoors to the cooler, dryer incoming fresh air. During the cooling season, such exchangers transfer heat and moisture from entering warm moist outdoor air to the cooler drier air as it is exhausted to the outdoors. Transfer of heat and moisture in this manner can typically reduce the amount of energy required to heat, cool, humidify or dehumidify the incoming ventilation air typically anywhere between about 50% and about 85%, depending primarily on the performance characteristics of the rotary heat exchange wheel employed.

Rotary heat exchange wheels have also been used to condition the gas flow circuit of a fuel cell system. Fuel cells generate electrical energy by chemical reaction. Examples of fuel cells include proton exchange membrane (PEM) fuel cells, phosphoric acid fuel cells, and alkaline fuel cells.

Fuel cells generally require two independent gas flow circuits for delivering reactant gases to an anode and a cathode of the fuel cell. The anode circuit feeds the fuel to the fuel cell, and the cathode circuit feeds the oxidant, typically ambient air, to the fuel cell. In order to maintain proper operating conditions for the fuel cell, the temperatures and humidities of the anode and cathode circuits must be carefully controlled to avoid drying out the electrolyte of the fuel cell, and thereby stopping the flow of electricity from the fuel cell.

U.S. Pat. No. 6,013,385 to DuBose, for example, shows a cathode humidification system including an enthalpy wheel, including a zeolite desiccant coating, for conditioning the oxidant. The enthalpy wheel operates by removing both sensible and latent heat from a cathode exhaust stream to heat and humidify a cathode inlet stream. DuBose states that the mass of the enthalpy wheel transports sensible heat, while the desiccant traps and transfers water vapor molecules and, thereby, latent heat. DuBose also shows varying the speed of rotation of the enthalpy wheel to vary the amount of moisture transferred to the cathode inlet, and using temperature, pressure, and relative humidity sensors to monitor the cathode inlet conditions and provide feedback control for the rotational speed of the enthalpy wheel.

As is known, an enthalpy wheel comprises a matrix of heat exchange material coated with a desiccant material capable of absorbing moisture in the form of water vapor. An enthalpy wheel is conventionally used where the transfer of both heat and moisture is desired. Suitable heat exchange materials are plastics (i.e., high molecular weight, synthetic polymers), aluminum, or papers made from either natural or synthetic fibers, while suitable desiccants are silica, alumina, and zeolites (molecular sieves). An enthalpy wheel may comprise a plastic strip coated with a desiccant material and wound in a spiral fashion around a hub.

A sensible wheel, in contrast, generally includes only a matrix of desiccant-free heat exchange media and is conventionally used where a transfer of heat alone is required. The prior art, including DuBose, has taught that an enthalpy wheel is required for transferring both heat and moisture efficiently between counter-flowing air streams, and that an enthalpy wheel should be used for such applications.

However, a sensible wheel has many practical advantages over an enthalpy wheel, if the sensible wheel can accomplish the required function. To begin with, a sensible wheel is generally easier and less expensive to manufacture, since a sensible wheel does not include a coating of desiccant over its sensible heat exchange media. In addition, many desiccants used in enthalpy wheels often adsorb and transfer contaminants found in the exhaust air stream along with the moisture. Furthermore, the desiccants themselves may detach in small pieces from the wheel and act as contaminants.

Accordingly, it would be desirable to have the option of using a desiccant-free heat exchange wheel in applications where both heat and a relatively large amount of moisture are to be efficiently transferred between counter-flowing air streams.

SUMMARY OF DISCLOSURE

The present disclosure provides a system for conditioning a gaseous supply stream. The system includes a desiccant-free heat and moisture exchange wheel that efficiently transfers both heat and moisture between a warmer, substantially saturated gaseous exhaust stream and a gaseous supply stream such that the supply stream becomes heated and substantially saturated.

The presently disclosed conditioning system beneficially allows the use of a desiccant-free heat and moisture exchange wheel in applications requiring the transfer of both heat and relatively large amounts of moisture between counter-flowing air streams. The desiccant-free heat and moisture exchange wheel is designed in accordance with the present disclosure to transfer moisture through a process of condensation and re-evaporation. In general, a desiccant-free wheel provides the benefits of being easier and less expensive to manufacture than an enthalpy wheel, which is conventionally used in such heat and moisture applications, since an enthalpy wheel includes a coating of desiccant material over its sensible heat exchange media for trapping, transferring, and releasing non-condensing water vapor between counter-flowing air streams.

These and other features and benefits of the present disclosure will become more apparent upon reading the following specification in conjunction with the accompanying drawing figures.

DETAILED DESCRIPTION OF DISCLOSURE

Figure 1:
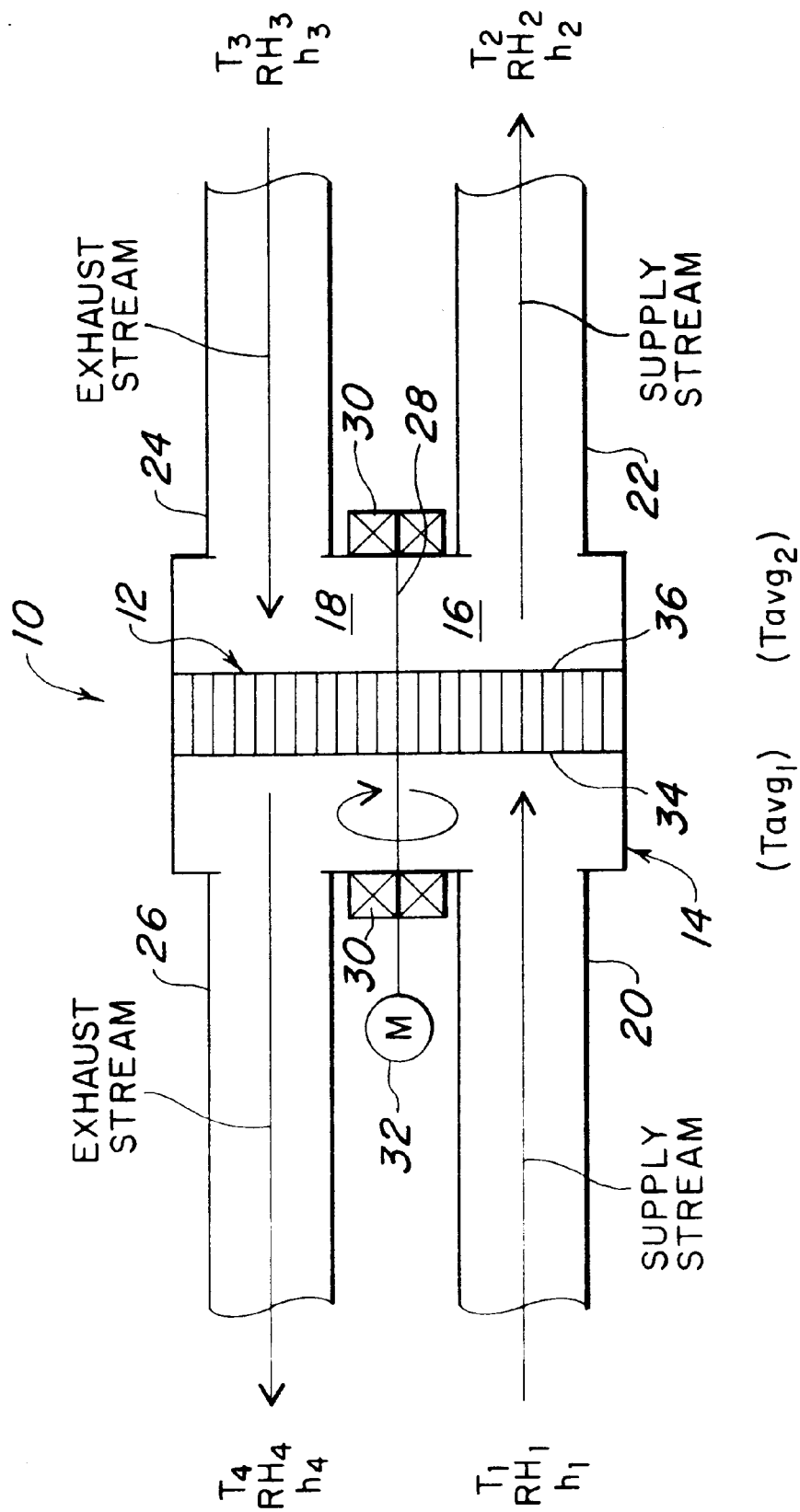
FIG. 1 is a schematic diagram of a regenerator heat exchange device according to the present disclosure.

Referring to FIG. 1, a regenerator heat exchanger 10 made in accordance with the present disclosure is shown. The heat exchanger 10 provides the benefit of incorporating a desiccant-free heat and moisture exchange wheel 12 in certain applications where there is a need for an efficient transfer of both heat and a relatively large amount of moisture between counter-flowing air streams, where the warmer stream is nearly saturated with water vapor.

The heat exchanger 10 includes an enclosure 14 having a flow chamber 16 and a counter-flow chamber 18. A gaseous supply stream is received by the flow chamber 16 through a supply inlet 20, and leaves the flow chamber through a supply outlet 22. A gaseous exhaust stream is received by the counter-flow chamber 18 from an exhaust inlet 24, and released through an exhaust outlet 26. As their names imply, the flow and counter-flow chambers 16, 18 direct the supply and exhaust streams in counter-flowing directions.

As shown, the desiccant-free heat and moisture exchange wheel 12 is mounted within the enclosure 14 of the exchanger 10 for rotation between the flow chamber 16 and the counter-flow chamber 18, with an outer circumference of the wheel 12 forming a nearly air-tight seal between the wheel 12 and the enclosure 14. The desiccant-free heat and moisture exchange wheel 12 is secured to a drive shaft 28 for rotation therewith. The drive shaft 28 extends between two bearings 30 secured to the enclosure 14 and is rotated by a motor 32. A first face 34 of the wheel 12 rotates between the supply inlet 20 and the exhaust outlet 26, while a second face 36 of the wheel rotates between the supply outlet 22 and the exhaust inlet 24. The desiccant-free heat and moisture exchange wheel 12 includes passages (not shown) formed therein that extend between the first and the second faces 34, 36. Accordingly, the supply stream in the flow chamber 16 passes through the wheel 12 from the first face 34 to the second face 36, while the exhaust stream in the counter-flow chamber 18 passes through the wheel 12 from the second face 36 to the first face 34.

Ideally, the rotating desiccant-free heat and moisture exchange wheel 12 absorbs sensible heat from the warmer exhaust stream, and transfers the absorbed sensible heat to the cooler supply stream. Water vapor, on the other hand, condenses into droplets or a thin film on exposed surfaces of the desiccant-free wheel 12 in the more humid exhaust stream whenever the surface temperature of the matrix is below the dew point of the exhaust stream. The rotating wheel 12 then transfers the condensed water to the dryer supply stream, where the water is re-evaporated. Latent heat of condensation, therefore, is also absorbed by the rotating wheel in the exhaust stream and transferred to the supply stream, where the absorbed latent heat is released in the re-evaporation process.

Preferably, the desiccant-free wheel 12 comprises a desiccant-free heat exchange matrix coaxially mounted on a central hub. The matrix comprises a strip of a high molecular weight synthetic polymer, such as polystyrene or polycarbonate, spirally wound around the hub. The strip is preferably provided with suitable surface projections so as to provide passages between the layers of the strip. Many types of embossments or deformations of such a strip are known in the art. Examples of sensible heat exchange matrixes and constructions thereof are discussed in U.S. Pat. No. 5,937, 933 to Steele et al., which is assigned to the assignee of the present disclosure and incorporated herein by reference in its entirety. It should be understood, however, that the heat and moisture exchange wheel 12 disclosed herein does not incorporate a desiccant material coating for absorbing moisture. The wheel 12 is simply constructed from a sensible heat exchange material and, thus, has surfaces that do not substantially hold moisture by absorption.

It has been found that the desiccant-free heat and moisture exchange wheel 12 can be used in an application requiring the efficient transfer of both heat and a relatively large amount of moisture, and the substantial saturation of the supply stream if certain conditions are met. To begin with, the desiccant-free wheel 12 must have a matrix mass great enough, within the bounds of acceptable physical dimensions of the wheel, to store both sensible heat and latent heat of condensation. In addition, the desiccant-free wheel 12 is rotated at a great enough speed of rotation to allow the desired transfer of moisture through condensation and re-evaporation. Furthermore, the heat exchanger 10 is operated such that the faces 34, 36 of the desiccant-free wheel 12 are cooler than dew points of the exhaust stream to allow condensation of moisture from the exhaust stream onto the wheel. The heat exchanger 10 is also operated such that the faces 34, 36 of the desiccant-free wheel 12 are warmer than dew points of the supply stream to allow re-evaporation of moisture from the wheel into the supply stream.

Referring to FIG. 1 and the Table below, exemplary operating conditions of the heat exchanger 10 are provided to demonstrate the ability of the desiccant-free heat and moisture exchange wheel 12 to efficiently transfer heat and moisture between the exhaust stream and the supply stream. As will be noted, the exhaust stream at the exhaust inlet 24 is saturated, the supply stream at the supply inlet 20 is not saturated, and it is desired that the conditioned supply stream at the supply outlet 22 be saturated or nearly saturated.

TABLE

Exemplary Operating Conditions for Heat Exchanger

| | Supply Inlet | Supply Outlet | Exhaust Inlet |
| --- | --- | --- | --- |
| Temperature | $T_1 = 70°$ F. | $T_2 = 154°$ F. (Desired) | $T_3 = 158°$ F. |
| Relative Humidity | $RH_1 = 50\%$ | $RH_2 = 100\%$ (Desired) | $RH_3 = 100\%$ |
| Dew Point | $dp_1 = 55°$ F. | $dp_2 = 154°$ F. (Desired) | $dp_3 = 158°$ F. |

Assuming equal mass flow rates of the supply and exhaust streams, and a system operating pressure of 1 atmosphere, other conditions of the supply and exhaust stream are determined from known psychrometric charts. The determined conditions are then used to calculate enthalpies "h" using thermodynamic equations known to those skilled in the art of the present disclosure. In particular, the enthalpy $h_1$ of the supply stream at the supply inlet 20, the enthalpy $h_2$ of the supply stream at the supply outlet 22, and the enthalpy $h_3$ of the exhaust stream at the exhaust inlet 24 can be calculated from the known temperatures and relative humidities using thermodynamic equations.

From an energy balance of the heat exchanger 10, the following equation is provided:

$$h_2 - h_1 = h_3 - h_4$$

From the energy balance equation and the known enthalpies $h_1$, $h_2$, $h_3$, the enthalpy $h_4$ of the exhaust stream at the exhaust outlet 26 is determined. From the known enthalpy $h_4$ and relative humidity $RH_4$ of the exhaust stream at the exhaust outlet 26, the temperature $T_4$ of the exhaust stream at the exhaust outlet 26 is then calculated by trial and error using thermodynamic equations. For the above example, the temperature $T_4$ of the exhaust stream at the exhaust outlet 26 is found to be about 98° F.

Once all supply stream and exhaust stream temperatures are known, the average temperatures of the faces 34, 36 of the desiccant-free heat and moisture exchange wheel 12 are compared to the dew points of the exhaust stream to ensure that condensation and re-evaporation are allowed. In particular, the average temperature "$T_{avg1}$" of the first face 34 of the wheel is:

$$T_{avg1} = \frac{1}{2}(T_4 + T_1) = \frac{1}{2}(98° \text{ F.} + 70° \text{ F.}) = 84° \text{ F.}$$

The average temperature "$T_{avg2}$" of the second face 36 of the wheel 12 is:

$$T_{avg2} = \frac{1}{2}(T_3 + T_2) = \frac{1}{2}(158° \text{ F.} + 154° \text{ F.}) = 156° \text{ F.}$$

Referring back to the Table, since the average temperature $T_{avg1} = 84°$ F. of the first face 34 of the wheel 12 is less than the dew point $dp_4 = 98°$ F. at the exhaust outlet 26, and the average temperature $T_{avg2} = 156°$ F. of the second face 36 of the wheel is less than the dew point $dp_3 = 158°$ F. at the exhaust inlet 24, water vapor from the exhaust stream condenses on the surfaces of the desiccant-free heat and moisture exchange wheel 12. In addition, since the average temperature $T_{avg1} = 84°$ F. of the first face 34 of the wheel 12 is greater than the dew point $dp_1 = 55°$ F. at the supply inlet 20, and the average temperature $T_{avg2} = 156°$ F. of the second face 36 of the wheel is greater than the dew point $dp_2 = 154°$ F. at the supply outlet 22, water droplets on the surfaces of the desiccant-free heat and moisture exchange wheel 12 re-evaporate in the supply stream.

To determine the necessary mass "$M_{wheel}$" of the desiccant-free heat and moisture exchange wheel 12, a ratio "$C_r^*$" of a heat capacity rate of the rotating mass of the wheel 12, to a heat capacity rate of the air stream is assumed to be at least about five (5). A ratio $C_r^*$ of at least about 5 has been chosen, since it has been found that ratios less than 5 produce inferior heat transfer efficiencies, while ratios substantially greater than 5 produce negligible gains in heat transfer efficiency. Accordingly:

$$c_r^* \geq 5 = (M_{wheel} \times RPM_{wheel} \times C_p) \div (m_{air} \times c_p)$$

Where "$RPM_{wheel}$" is the speed of rotation of the wheel, "$C_p$" is the specific heat of the wheel, "$m_{air}$" is the flow rate of the air stream, and "$c_p$" is the effective specific heat of the air stream.

First, assuming the average effective specific heat of the air stream is equal to the change in enthalpy of the air stream divide by the temperature change of the air stream, then:

$$c_p = (h_2 - h_1) \div (T_2 - T_1) = 3.405 \text{ Btu/lb.} \cdot ° \text{ F.}$$

Assuming the specific heat of the wheel is equal to the specific heat of polystyrene (0.335 btu/lb.·° F.), then:

$$c_r \geq 5 = (M_{wheel} \times RPM_{wheel} \times 0.335 \text{ btu/lb.} \cdot ° \text{ F.}) \div (m_{air} \times 3.405 \text{ Btu/lb.} \cdot ° \text{ F.})$$

And therefore:

$$M_{wheel} \geq 50.8 \times m_{air} \div RPM_{wheel}$$

As an example, for a preferred air stream flow rate of 1.5 lbs. per minute, and a preferred wheel rotation speed of 33 rpm, the wheel 12 requires a mass of at least 2.3 lbs. For a 7 mil×7 mil strip of polystyrene wound at 50 wraps per inch, a 7 inch long wheel having a 6 inch diameter has a matrix weight of 2.6 lbs. Accordingly, a wheel having a mass of at least 2.3 lbs. is acceptable according to this analysis.

Accordingly, the present disclosure beneficially provides a regenerator heat exchanger 10 incorporating a desiccant-free heat and moisture exchange wheel 12 in applications where both heat and relatively large amounts of moisture are to be efficiently transferred between counter-flowing air streams when the warmer air stream is nearly saturated with water vapor. As discussed previously, a desiccant-free wheel is preferred over an enthalpy wheel because a desiccant-free wheel is generally easier and less expensive to manufacture. In addition, a regenerator heat exchanger incorporating a desiccant-free heat and moisture exchange wheel, as disclosed herein, is very desirable since many desiccants used in enthalpy wheels often adsorb and transfer contaminants found in the exhaust air stream, and since the desiccants themselves may detach and act as contaminants.

Figure 2:
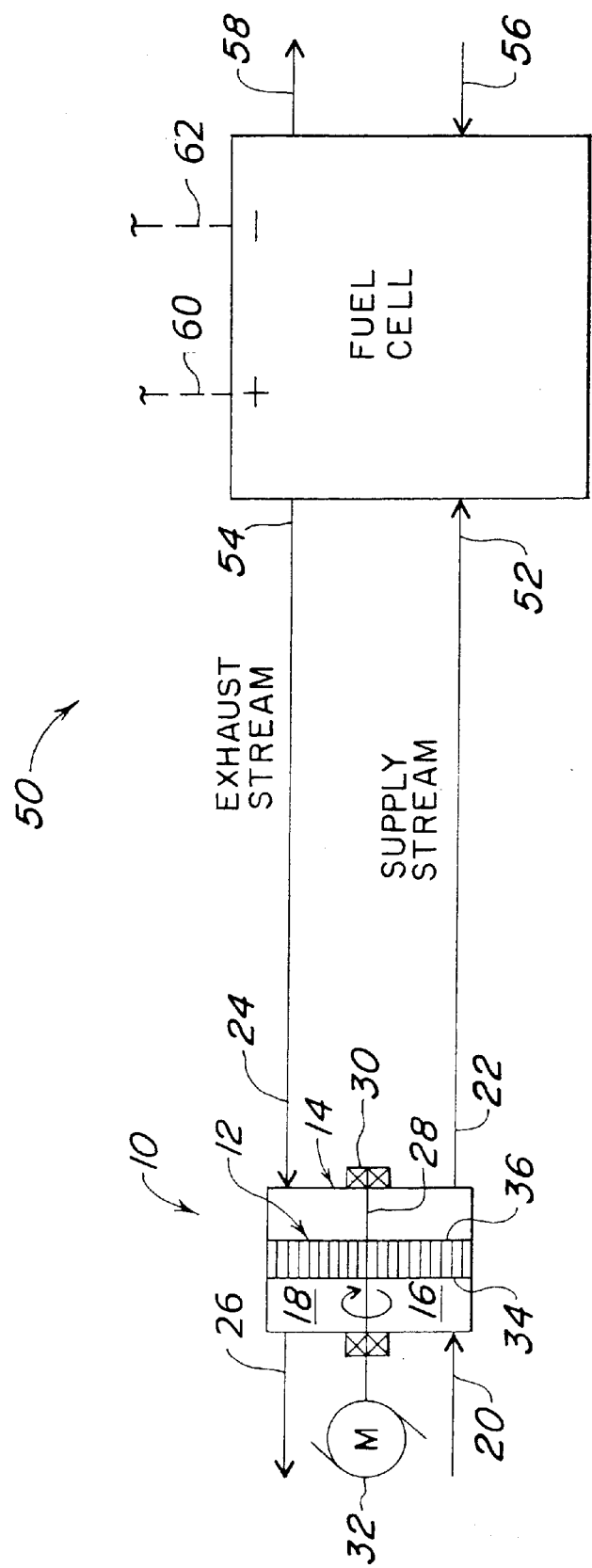
FIG. 2 is a schematic diagram of a fuel cell incorporating the regenerator heat exchange device of FIG. 1.

Referring now to FIG. 2, a fuel cell 50 including the regenerator heat exchanger 10 of FIG. 1 is shown. The fuel cell 50 generally comprises a cathode inlet 52, a cathode outlet 54, an anode inlet 56, an anode outlet 58, and conductors 60, 62 for conducting electricity generated by the fuel cell 50 to a load (not shown). The fuel cell 50 can be used to supply electrical power for a variety of applications, such as recharging batteries of an electric automobile, or used as a power source for commercial or household electrical service.

The fuel cell 50 operates according to known methods, and may be any of a number of known fuel cell varieties. In general, a gaseous fuel is supplied to the anode of the fuel cell and a gaseous oxidant is supplied to the cathode of the fuel cell. The fuel cell 50 generates water and electrical power through a chemical reaction between the fuel and the oxidant. An electrolyte solution maintained between the anode and the cathode conducts the generated electrical power through the fuel cell 50 to the conductors 60, 62. The chemical reaction between fuel and oxidant causes an exhaust stream from the cathode outlet 54 to be at an elevated temperature and humidity, i.e., substantially saturated, relative to a supply stream delivered to the cathode inlet 52.

Because the fuel cell 50 operates best at elevated temperatures, and because the electrolyte solution must be maintained in a moist condition in order to stay conductive, it has been found necessary to heat and humidify the supply stream to the cathode inlet 52. As shown in FIG. 2, accordingly, the fuel cell is provided with the presently disclosed regenerative heat exchanger 10 for heating and humidifying the supply stream, supplied to the cathode inlet 52.

Still referring to FIG. 2, the regenerative heat exchanger 10 draws in ambient air, i.e., the gaseous supply stream, to the supply inlet 20 of the heat exchanger 10. The preferred operating conditions of the fuel cell 50 require the supply stream at the cathode inlet 52 to be substantially saturated. Thus, the heat exchanger 10 transfers heat and humidity from the exhaust stream of the cathode to the supply stream of the cathode through the rotating desiccant-free heat and moisture exchange wheel 12. From the supply outlet 22 of the heat exchanger 10, the conditioned gaseous supply stream is directed to the cathode inlet 52.

From the cathode outlet 54, the gaseous exhaust stream is direct through the exhaust inlet 24 of the heat exchanger 10 into the counter-flow chamber 18 such that heat and moisture can be transferred from the exhaust stream to the supply stream through the rotating desiccant-free heat and moisture exchange wheel 12. The exhaust stream then passes through the exhaust outlet 26 of the heat exchanger 10 to the atmosphere.

It should be understood that the foregoing detailed description and preferred embodiments are only illustrative of a cathode conditioning system and a regenerator heat exchanger according to the present disclosure. Various alternatives and modifications to the presently disclosed conditioning system and heat exchanger can be devised by those skilled in the art without departing from the spirit and scope of the present disclosure. Accordingly, the present disclosure is intended to embrace all such alternatives and modifications that fall within the spirit and scope of the appended claims.

What is claimed is:

1. A fuel cell comprising:
   a conditioning system including,
     a flow chamber,
     a counter-flow chamber, and
     a desiccant-free heat and moisture exchange wheel rotatably mounted between the flow and the counter-flow chambers;
   a cathode having an inlet connected to the flow chamber of the conditioning system and an outlet connected to the flow chamber of the conditioning system; and
   an anode for chemically reacting with the cathode to generate electrical energy.

2. A system according to claim 1, wherein the desiccant-free heat and moisture exchange wheel comprises a high molecular weight synthetic polymer film.

3. A system according to claim 2, wherein the high molecular weight synthetic polymer is provided in the form strips spirally wound around a hub.

4. A system according to claim 3, wherein the spirally wound strips include at least two layers, and wherein at least one of the layers has surface projections providing passages between the layers of the strip.

5. A method for conditioning a gaseous supply stream such that the supply stream becomes heated and substantially saturated, comprising:
   (a) receiving an unsaturated gaseous supply stream;
   (b) receiving an exhaust stream substantially saturated, the exhaust stream having a temperature greater than a temperature of the supply stream;
   (c) providing a desiccant-free heat and moisture exchange wheel; and
   (d) rotating the desiccant-free wheel through the substantially saturated gaseous exhaust stream and the gaseous supply stream such that the desiccant-free wheel,
   collects heat from the exhaust stream through conduction and releases heat into the supply stream through conduction, and
   collects moisture from the exhaust stream through condensation and releases moisture into the supply stream through evaporation; and
   wherein the desiccant-free heat and moisture exchange wheel is rotated at a predetermined rotational speed equal to at least about fifty times a mass flow rate of the supply stream divided by a matrix mass of the desiccant-free wheel,
   further comprising directing the heated and substantially saturated gaseous supply stream to an inlet of a cathode of a fuel cell and receiving the substantially saturated gaseous exhaust stream from an outlet of the cathode.

6. A method for conditioning a gaseous supply stream such that the supply stream becomes heated and substantially saturated, comprising:
   (a) receiving an unsaturated gaseous supply stream;
   (b) receiving a substantially saturated gaseous exhaust stream having a temperature greater than a temperature of the supply stream; and
   (d) rotating a desiccant-free wheel through the exhaust stream and the supply stream such that the wheel collects heat from the exhaust stream through conduction and releases heat into the supply stream through conduction, and collects moisture from the exhaust stream through condensation and releases moisture into the supply stream through evaporation; and
   wherein the desiccant-free heat and moisture exchange wheel is provided with average local surface temperature less than a dew point of the exhaust stream and greater than a dew point of the supply stream,
   further comprising directing the heated and substantially saturated gaseous supply stream to an inlet of a cathode of a fuel cell and receiving the substantially saturated gaseous exhaust stream from an outlet of the cathode.

7. A method for conditioning according to claim 6, wherein:
   the heat exchange matrix of the desiccant-free wheel is provided with a predetermined mass;
   the desiccant-free wheel is rotated at a predetermined rotational speed; and
   the predetermined mass and the predetermined rotation speed, in combination, allow the desiccant-free wheel to transfer both sensible heat and a desired amount of latent heat between the exhaust stream and the supply stream.

* * * * *

UNITED STATES PATENT AND TRADEMARK OFFICE
CERTIFICATE OF CORRECTION

PATENT NO. : 6,565,999 B1  
DATED : May 20, 2003  
INVENTOR(S) : Lawrence C. Hoagland It is certified that error appears in the above-identified patent and that said Letters Patent is hereby corrected as shown below:

<u>Title page,</u>  
Item [75], should be  
-- [75] Inventor: Lawrence C. Hoagland --

Signed and Sealed this

Twenty-third Day of December, 2003

JAMES E. ROGAN  
*Director of the United States Patent and Trademark Office*